Nov. 15, 1938.   H. DALLMANN   2,137,133
APPARATUS FOR INTEGRATING VARIABLE QUANTITIES
Filed June 18, 1934
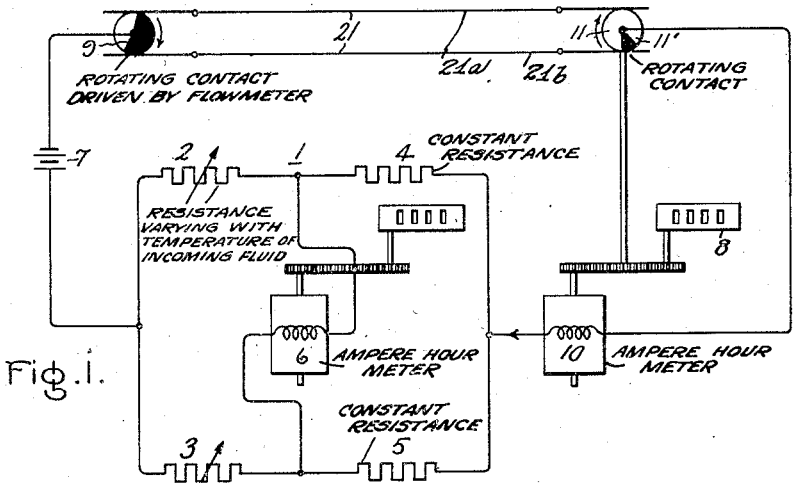
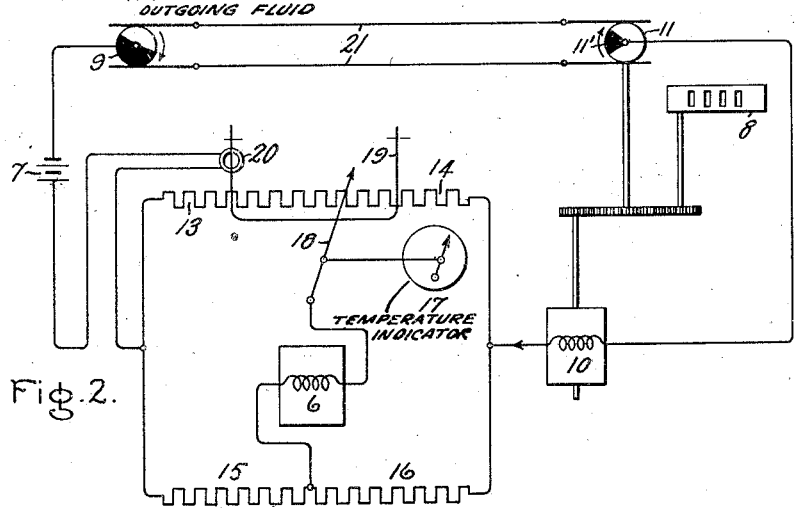
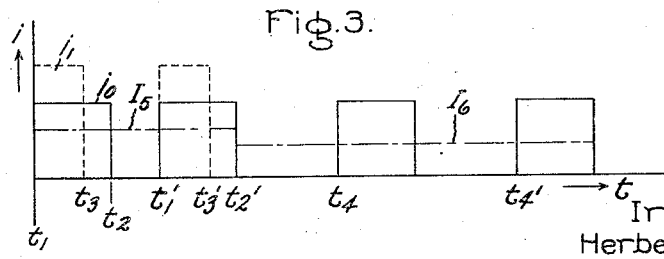
Inventor:
Herbert Dallmann,
by Harry E. Dunham
His Attorney.

Patented Nov. 15, 1938

2,137,133

UNITED STATES PATENT OFFICE 2,137,133

APPARATUS FOR INTEGRATING VARIABLE QUANTITIES

Herbert Dallmann, Berlin-Karlshorst, Germany, assignor to General Electric Company, a corporation of New York Application June 18, 1934, Serial No. 731,152
In Germany June 28, 1933

14 Claims. (Cl. 73—193)

My invention relates to apparatus for integrating variable quantities and concerns particularly methods and apparatus for integrating the product of two variable quantities.

It is an object of my invention to provide a heat quantity meter adapted to register the quantity of heat supplied to a moving heat-absorbing substance, for example water in response to the rate of flow of such substance and the temperature or the temperature rise of the substance.

It is a further object of my invention to provide an electrical arrangement for multiplying and integrating two variable quantities which shall be independent of variations in voltage of an auxiliary source of current utilized to energize the apparatus.

Still another object of my invention is to provide an improved form of impulse telemeter. It is also an object of my invention to provide an arrangement for obtaining compensation for voltage variations in electric measuring apparatus including telemeters of the impulse type.

Other and further objects and advantages will become apparent as the description proceeds.

In accordance with my invention in its preferred form, I utilize a resistance bridge of the Wheatstone type in which the resistances of one or more of the arms are varied in accordance with temperature variations, and blocks of current are supplied to the bridge at a rate depending upon the rate of flow of the heat-absorbing material, the quantity of heat in which is to be measured. To compensate for variation in voltage of the current supply, means are provided for permitting the blocks of supply current to flow for intervals of time inversely proportional to the voltage of the current source. The measurement of heat quantity is obtained by means of an ampere-hour meter connected in the cross-circuit of the Wheatstone bridge.

The features of my invention which I believe to be novel and patentable will be pointed out in the claims appended hereto. For a better understanding of my invention, reference may be had to the following description taken in connection with the accompanying drawing in which Fig. 1 is a circuit diagram illustrating one embodiment of my invention; Fig. 2 is a circuit diagram of another embodiment of my invention; and Fig. 3 is a graph illustrating the principle of operation of my invention.

Referring now more in detail to the drawing in which like reference characters are utilized to designate like parts throughout, in the arrangement of Fig. 1, I provide a Wheatstone bridge 1 having four resistance arms 2, 3, 4, and 5 connected in series parallel. An ampere-hour meter 6 having a winding connected in a cross-circuit between the common terminal of arms 2 and 4 and the common terminal of arms 3 and 5 is provided for registering the time integral of the product of two variable quantities. One or more of the arms of the bridge 1 are arranged to have their resistances vary in accordance with the variations in one of the quantities to be multiplied, for example, the temperature or the temperature rise of a heat-absorbing substance in which heat quantity is to be measured.

If desired, one of the arms, such as the arm 2, may be arranged to vary in resistance in accordance with the variations in temperature of the incoming heat-absorbing substance, such as water in a hot-water heating system, and another arm 3 may be arranged to have its resistance vary in accordance with variations in temperature of the outgoing heat-absorbing substance, such as the water in a hot-water heating system. If desired, of course, either arm 2 or 3 may be arranged to vary in resistance in accordance with temperature change instead of temperature of the heat-absorbing substance and the other arm could then be of constant resistance. Likewise, if the total heat quantity is to be measured instead of heat supplied to or withdrawn from the heat-absorbing substance, then only one of the arms would be made variable and its resistance would be made proportional to the temperature of the heat-absorbing substance. The variation in resistance of the bridge arms may take place in any desired manner as by means of a variable contact moved by a temperature-responsive device, or the resistance material itself may be subjected to the variable temperature and its resistance caused to vary in consequence of the effect of temperature on the resistance of an electrical conducting material, such that the current through meter 6 varies with the temperature relation under investigation.

The bridge 1 is supplied with current by a source 7 in a circuit connected between the common terminal of arms 2 and 3 and the common terminal of arms 4 and 5.

A rotating contact or current shifter 8 is provided which operates at a rate proportional to the second of the quantities to be multiplied, such as, for example, the rate of flow of a heat-absorbing substance in which the heat quantity is to be measured. Rotating contact 9 may be connected, for example, to a water meter in a hot-water heating system. The circuit of the supply source 7 also includes an ampere-hour meter 10 driving a rotating contact 11 to form a current quantity relay. A pair of brushes is provided for each of the rotating contacts 9 and 11 and these are joined by a pair of conductors 21, providing alternative current paths for the current-supply circuit.

The rotating contact or current shifter 9 consists of a disc, approximately half of which is conducting and the other half of which is non-conducting so that the connection of current source 7 is alternately shifted from one of the alternative conductors 21 to the other as the device 9 rotates. The rotating contact 11 consists of a disc of conducting material having a sector 11' of non-conducting material so that, as the contact 11 rotates, the circuit through one or the other of the alternative conductors 21 is intermittently interrupted but, in the intervals between such interruptions, there is a connection from contact 11 to both of the conductors 21. The apparatus is so designed that, for the minimum current flowing in the ampere-hour meter 10 corresponding to the minimum value to which the voltage of the supply source 7 may drop, the rotating contact 11 will be rotated to one of its current-interrupting positions before contact 9 has shifted the connection from one of the conductors 21 to the other. In other words the constant of the integrating meter 10 and rotating contact 11, or the number of ampere-hours per half revolution of the contact shaft must be such that, with the minimum value of instantaneous current which may be encountered, the rotating contact 11 will move one-half revolution in less time than that required for the current shifter 9 to travel one-half revolution.

If desired, the ampere-hour meter 10 may be provided with a register 8 for measuring the quantity of the heat-absorbing material in a manner which will become apparent from the following explanation of the operation of the apparatus.

At the instant when the rotating contacts 9 and 11 are in the position shown, current will flow through the bridge 1, the ampere-hour meter 10 and the upper one of the conductors 21. The current in the ampere-hour meter 10 will, of course, be dependent upon the resistances of the arms of the bridge 1 which, in turn, depend upon the temperature or temperature change in the heat-absorbing substance. The current flowing in ampere-hour meter 10 will cause the contact 11 to rotate until a predetermined quantity of electricity has flowed in the circuit, when the insulating segment 11' will reach the upper position, interrupting the circuit through the upper conductor 21. However, when the contact 9 has rotated to the lower position, a current will again flow, following the current path through the lower of the conductors 21. The ampere-hour meter 10 will again rotate the contact 11 until a predetermined quantity of electricity has flowed and the insulating segment 11' interrupts the circuit in its lower position.

Referring to Fig. 2, in which $i$ represents the current in ampere-hour meter 10 and $t$ represents time, it will be seen that a number of blocks of current pass through ampere-hour meter 10 in a given time, depending upon the rate at which the current shifter 9 rotates. For example, assuming a given rate of rotation and a given voltage of source 7, at time $t_1$, a circuit is made through the upper conductor 21 and broken at time $t_2$ and, during this period, a current $i_0$ flows. At time $t_{1'}$, a connection is made to the lower conductor 21 and current flows until it is interrupted at time $t_{2'}$. However, if now the heat-absorbing material flows at a slower rate, causing contact 9 to rotate more slowly, the current shifter 9 will not make the succeeding contacts until the times $t_4$ and $t_{4'}$. The average current falls from $I_5$ to $I_6$ as the rate of flow of the heat absorbing material decreases. The ratio of the average current $I_5$ or $I_6$ to the instantaneous current $i_0$ varies in response to variations in the rate of flow of the heat-absorbing medium.

In case the voltage of the source 7 increases, assuming the original speed of rotation of contact 9, the current will also increase from the value $i_0$ to a greater value, such as $i_1$. However, the current will be cut off at the time $t_3$ by current quantity relay 11 since the ampere-hour meter 10 or current quantity relay is responsive to constant quantities of electricity. The total electricity flowing through the ampere-hour meter 10 or the average value $I_5$ is, therefore, unchanged by the variation in voltage of the source 7. In a similar manner, although the magnitude of the current flowing in ampere-hour meter 10 increases with an increased voltage, the current will be cut off more quickly so that the registration of ampere-hour meter 6, representing heat quantity, also is unaffected by variations in voltage of source 7.

Since the total number of blocks of current flowing through the ampere-hour meter 10 depends upon the number of revolutions of the rotating contact 9, the registration of the ampere-hour meter 10 provides a record of the total quantity of heat-absorbing substance which has flowed in the system in which the heat quantity is measured by the ampere-hour meter 6.

Although in the drawing I have illustrated the parts as being relatively close together, it will be understood that a close proximity of the parts of the apparatus is not essential to its operation. My invention is, in fact, well adapted to telemetering systems and one or more of the parts of the apparatus may be remotely located for the purpose of transmitting measurements to a distance. For example, if the water meter is located at a distance from a point at which it is desired to read the total quantity of water or the heat quantity, the rotating contact 9 may be located at a distance and joined to the remainder of the apparatus by the three conductors cooperating with rotating contact 9. It will be seen that the apparatus then forms a telemetering system of the current-impulse type in which possible variations in voltage of the current-supply source are compensated for. If it were desired to transmit only readings of the quantity of water or the number of revolutions of the rotating contact 9 from a transmitting point at the contact 9 to a receiving point at the meter 10, the bridge circuit 1 could, of course, be omitted.

Although I have referred to the use of ampere-hour meters and have shown a direct-current supply source, it will be understood that my invention is not limited to this precise arrangement since direct-current watt-hour meters or an alternating source of current and alternating-current watt-hour or current meters may also be employed to advantage. In using watt-hour meters, the voltage windings are preferably connected to the common voltage source in order that any existing temperature errors of the current quantity relay 10 or the heat quantity meter 6 will be eliminated by not influencing the ratio of the speeds of the devices 10 and 6.

My invention is not limited to use of electric circuit elements having particular electrical constants or to a particular relationship between the constants of the elements of the apparatus, and suitable values of the constants will suggest themselves to those skilled in the art for obtaining the best results in connection with the type and range of measurements which it is desired to make. However, to facilitate the understanding of my invention the operation thereof will be explained in connection with a numerical example.

Let it be assumed that the rate of flow of the heating medium is such that the current shifter 9 maintains connection between it and the current interrupter 11 for a period of 40 seconds and breaks the connection for a period of 60 seconds, that the resistance of the entire circuit varies between 100 and 200 ohms as a result of variations in the resistors 2 and 3 produced by temperature changes and that the electromotive force of the current source 7 fluctuates between 4 and 3 volts, while the integrating meter 10 has such an electrical constant as to rotate the contact 11 through an angle of 180 degrees in 30 seconds when 15 milliamperes are flowing.

In a period of 100 seconds during which a complete revolution of the current shifter 9 takes place, assuming the condition when the current source 7 has an electromotive force of three volts and the entire resistance of the circuit is 100 ohms the following events will occur:

At the time zero the current shifter 9 closes the connection between the current source 7 and the upper conductor 21a of the pair of conductors 21 (see Figure 1) and the contact arrangement 11 is in such a position that the circuit is closed through the contact and the upper conductor 21a. In consequence, the integrating meter 10 begins to rotate. Under the conditions of voltage and resistance assumed 30 milliamperes flow. Accordingly, the integrating meter 10 causes the contact 11 to interrupt the circuit after 15 seconds, when a rotation of 180 degrees has taken place. After 40 seconds the current shifter 9 disconnects the current source, and after 50 seconds the current shifter 9 transfers the connection to the lower conductor 21b so that the integrating meter 10 runs again until 65 seconds have elapsed, the times in each case being measured from zero. Thereupon the contact 11 breaks the circuit again. For a period of twice 15 seconds a current of 30 milliamperes has flowed in the bridge.

If one assumes an electromotive force of 4 volts and an overall resistance of 100 ohms a current of 40 milliamperes flows in the bridge for a period of twice 11.25 seconds.

Assuming an electromotive force of 3 volts and an overall resistance of 200 ohms a current of 15 milliamperes flows in the bridge for a period of twice 30 seconds.

Assuming an electromotive force of 4 volts and an overall resistance of 200 ohms a current of 20 milliamperes flows in the bridge for a period of twice 22.5 seconds.

It is consequently immaterial what electromotive force exists in the circuit or how large the resistance is since, as the calculation will show, the current quantity which has flowed in the bridge during a period of 100 seconds is 900 milliampere-seconds in any case. If the speed of the transmitter driving the current shifter 9 is greater or less than assumed in the example, the time required for the meter 10 to make a complete revolution will be correspondingly decreased or increased.

In the arrangement of Fig. 2, the bridge consists of lower arms 15 and 16 having fixed resistances and upper arms 13 and 14 formed by two portions of a resistor of fixed resistance. A temperature indicator 17 of any desired type is provided, which actuates a movable contact 18 adapted to make contact intermittently with a point on the resistor forming the arms 13 and 14 depending upon the temperature indicated by indicator 17. A chopper bar 19 is provided for bringing movable contact 18 in contact with the resistor and a coil 20 connected in series with source 7 is provided for actuating the chopper bar 19 when current is flowing.

It will be apparent that, in the arrangement of Fig. 2, blocks of current will also be passed through ampere-hour meter 10 in dependence upon the quantity of heat-absorbing substance flowing in the system and that variations in voltage of the source 7 will be compensated for by variations in the length of time current is permitted to flow during each current-conducting interval. During non-conducting intervals, the chopper bar 19 is released and movable contact 18 is permitted to adopt a new position, in case of variations in temperature. The current flowing in ampere-hour meter 6 is thereby adjusted intermittently in order to provide a measurement of the total heat quantity or the product of temperature rise times quantity of heat-absorbing material.

It will be seen that an incorrect registration cannot be caused by the stoppage of the contact device 9 since the quantity relay 10 brings about automatic interruption of the current circuit.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. A heat quantity meter comprising in combination with a source of current, a resistance bridge supplied by said current source, an ampere-hour meter in series with said current supply, a pair of conductors interposed in the circuit of said current-supply to provide alternative current paths therebetween, a current shifter driven at a rate proportional to the rate of flow of a moving heat-absorbing substance in which heat quantity is to be measured and adapted alternately to transfer the circuit connection from one of said conductors to the other, and a current interrupter driven by said ampere-hour meter and adapted to interrupt the current in said conductors alternately whenever a predetermined quantity of electricity has flowed through said ampere-hour meter, said resistance bridge comprising resistance arms connected in series-parallel and a cross-circuit including a second ampere-hour meter serving to measure a heat quantity of the moving substance, said bridge arms including a resistance variable in accordance with temperature change in the heat-absorbing substance.

2. A heat quantity meter comprising in combination with a current supply source, an impedance bridge supplied by said current source, an integrating electric meter in series with said current supply, a pair of conductors interposed in the circuit of said current supply to provide alternative current paths between said source and said integrating meter, a current shifter driven at a rate proportional to the rate of flow of a heat-absorbing substance in which heat quantity is to be measured and adapted to transfer the circuit connection back and forth between said conductors, and a current interrupter driven by said electric meter and adapted to interrupt the current of said conductors each time said integrating meter has measured a predetermined quantity of current, said bridge comprising impedance arms in parallel circuits, and a cross-circuit including a second integrating electric meter serving to measure a heat quantity of the flowing substance, one of said bridge arms having an impedance variable in accordance with variations in temperature in the heat-absorbing substance.

3. An integrating product meter comprising in combination with a current supply source, an impedance bridge supplied by said current source, a current quantity relay in series with said current supply, a pair of conductors interposed in the circuit of said current supply to provide alternative current paths between said source and said relay, a current shifter driven at a rate proportional to one of two quantities to be multiplied and adapted to transfer the circuit connection back and forth between said conductors, and a current interrupter driven by said current quantity relay and adapted to interrupt the current in either of said conductors each time a predetermined quantity of electricity has flowed through said current quantity relay, said bridge comprising impedance arms in parallel circuits, and a cross-circuit including an integrating electric meter serving to measure the time integral of the product of the two quantities to be multiplied, one of said bridge arms having an impedance variable in accordance with variations in the second of the quantities to be multiplied.

4. A differential product integrator comprising in combination with a source of current supply, an impedance bridge connected in circuit with said current supply, a current quantity relay in series with said current supply, a pair of conductors interposed in the circuit of said current supply to provide alternative current paths between said supply and said relay, a current shifter driven at a rate proportional to a quantity to be multiplied by the difference between two other quantities and adapted to transfer the circuit connection back and forth between said conductors, and a current interrupter driven by said current quantity relay and adapted to interrupt the current in either of said conductors each time a predetermined quantity of electricity has flowed through said current quantity relay, said bridge comprising impedance arms in parallel circuits, and a cross circuit including an integrating meter providing a measurement of the time integral of the product of one quantity and the difference between two other quantities, one of said bridge arms having an impedance adapted to vary in accordance with one of the latter two quantities, and another of said bridge arms having an impedance adapted to vary in accordance with the other of the latter two quantities, thereby varying the division of current between said parallel circuits and said cross circuit in dependence upon variations in the difference between said latter two quantities.

5. An impulse current telemeter comprising in combination with a source of supply current, a current shifter in circuit with said source and driven at a rate proportional to the magnitude of an indication to be transmitted, a pair of conductors cooperating with said current shifter, adapted to provide alternate current paths and extending to the remote point to which indications are to be transmitted, and a third conductor extending to said remote point, an integrating electric meter located at said remote point and driving a current interrupter, said current shifter having a contact alternately connected to one or the other of said first two conductors at one end and said current interrupter having a contact intermittently disconnected from said first two conductors alternately at their other end, but otherwise connected to both of said conductors, said third conductor being connected to provide a return electrical circuit through said current interrupter, said integrating electric meter and said supply source, and said current interrupter being driven by said integrating meter to interrupt the current in either of said conductors each time said integrating meter has measured a predetermined quantity of current, whereby the registration of said meter is made dependent upon the number of operations of said current shifter and independent of variations in voltage of said current supply.

6. An impulse current telemeter comprising a pair of conductors adapted to provide alternate current paths and extending between a transmitting point and a receiving point, a return path conductor also extending between said transmitting and receiving points, a source of current connected in series with said return path conductor, an integrating meter at said receiving point also connected in series with said return path conductor, circuit-shifting means at the transmitting point for alternately connecting the conductors of said pair to the transmitter end of said return path conductor at a shifting rate proportional to the magnitude of the indication to be transmitted, and current-interrupting means connecting the receiving end of said return path conductor to one or the other of said pair of conductors and driven by said integrating meter for interrupting the circuit through whichever one of said pair of conductors is connected at the transmitter end, whenever said integrating meter has measured a predetermined quantity of current the strength of the current source and the constant of the said integrating meter and interrupting means being such as to cause circuit interruption to take place within the time required for the circuit shifting means to shift the connection from one of the pair of conductors to the other for the greatest magnitude indication to be transmitted.

7. An integrating product meter comprising an impedance bridge having supply terminals, means for supplying current in impulses through said supply terminals to said bridge at a rate dependent upon the magnitude of one of two quantities to be multiplied, and means for interrupting said current during each of said impulses when said impulse has supplied a predetermined quantity of electricity to said bridge, said bridge comprising two series pairs of impedance arms in two parallel circuits through said supply terminals, and a cross-circuit including an integrating electricity meter and connected between the common point of the impedances in one series pair and the common point of the impedances in the other series pair, at least one of said arms having an impedance adapted to be varied in dependence upon the magnitude of the second of the quantities to be multiplied, thereby varying the distribution of current between the parallel circuits and the cross-circuit of said bridge in response to variations in the second of said quantities and making the registration of said integrating electric meter dependent upon the time integral of the product of the multiplied quantities.

8. In an impulse current telemeter, means for producing and transmitting current impulses at a rate dependent upon the magnitude of a measurement to be transmitted, an integrating meter energized by said impulses to register the total quantity of electricity transmitted, and means having contacts in series with said integrating meter and driven by said integrating meter for interrupting each of such current impulses through said meter when a predetermined quantity of electricity has been transmitted during the impulse, thereby making the registration of said integrating meter dependent upon the total number of impulses received and independent of the magnitude of the currents during said impulses the current magnitude of the impulses and the constant of said integrating meter and interrupting means being such as to cause current interruption to take place within the time duration of impulses corresponding to the impulse rate representing the greatest measurement magnitude to be transmitted.

9. In a heat quantity measuring system, an electric measuring circuit including a temperature responsive impedance bridge in Wheatstone form with a cross circuit and with a pair of current supply terminals connected in the said measuring circuit, a source of current connected to said measuring circuit, flow-responsive circuit control means connected to said source for energizing said circuit from said source at intervals the frequency of which is proportional to a rate of flow, circuit control means connected to said first circuit control means and to said measuring circuit for deenergizing said measuring circuit each time it is energized after a period of time inversely proportional to the voltage of said source, and an integrating electric meter connected in the cross circuit of said bridge.

10. In a system for measuring the product of two quantities, an electric measuring circuit having branched paths in a portion thereof, a source of current being included in the circuit, circuit control means also included in the circuit for intermittently maintaining said source connected to the remainder of said circuit at intervals dependent upon one of said quantities and for periods of time which are inversely proportional to the voltage of said source, an electric integrating meter connected as a cross circuit between intermediate points in the branched paths of said measuring circuit, and means for diverting current from one of said branched paths to the other through said cross circuit in proportion to the other of said quantities, when the measuring circuit is energized.

11. A device for integrating the heat transfer effected by a flowing medium entering a heat transfer system at one temperature and leaving at another temperature comprising in combination, a source of current, an integrating electric meter, current-control means responsive to variations in the entering temperature of the medium, current-control means responsive to variations in the leaving temperature of the medium, means for connecting said current-control means to said current source to cause flow of current therethrough, means for passing the difference between said currents through said meter, circuit interrupting and connecting means in series with said current source, and flow-responsive means in operative relation with said circuit interrupting and connecting means for varying the relative periods of connection and interruption of said circuit interrupting and connecting means in response to variation in rate of flow.

12. A device for integrating the heat content of a flowing heat absorbing medium comprising in combination, an integrating electric meter, temperature-responsive current-control means, a source of current in circuit with said meter and said current-control means, circuit interrupting and connecting means, and a current-integrating unit in series with said current source, said circuit interrupting and connecting means having a movable connecting contact and a movable interrupting contact and stationary contacts cooperating therewith, flow-responsive means driving said circuit-connecting contact with a frequency proportional to rate of flow, said current-integrating unit having an ampere-hour responsive movable element connected to said circuit-interrupting contact to open the circuit after each passage of a predetermined number of ampere-hours.

13. A device for integrating the product of two quantities comprising in combination, an integrating electric meter, current control means responsive to variations in one of the quantities, a source of current in circuit with said meter and said current control means, current interrupting and connecting means and a current-integrating unit in series with said current source, said current interrupting and connecting means having a movable connecting contact and a movable interrupting contact and stationary contacts cooperating therewith, means responsive to variations in the other of the quantities driving said circuit-connecting contact with a frequency proportional to the magnitude of said other quantity, said current-integrating unit having an ampere-hour-responsive movable element connected to said circuit-interrupting contact to open the circuit after each passage of a predetermined number of ampere-hours.

14. A device for measuring the product of two quantities comprising a source of current, a main circuit connected thereto, said main circuit including a portion divided into a plurality of branches, one of which includes current-control means extending to an intermediate portion of the branch in which it is included, a cross circuit including an electric meter for showing the magnitude of the product and connected between intermediate points of two of said branches, said main circuit also including circuit interrupting and connecting means for alternately opening and closing the main circuit to produce current impulses therein, said circuit interrupting and connecting means including means for terminating each current impulse after a predetermined quantity of electricity has passed therein and means for intermittently closing the circuit to produce impulses with a frequency proportional to the magnitude of one of the quantities, said current-control means in the branch portion of the circuit being responsive to the variations in the other of the quantities to divert current from one branch to the other through the cross circuit in response to variations in said other quantity.

HERBERT DALLMANN.